(12) United States Patent
Campau

(10) Patent No.: US 6,257,626 B1
(45) Date of Patent: Jul. 10, 2001

(54) CONNECTOR FOR FLUID HANDLING SYSTEM

(75) Inventor: Daniel N. Campau, Grand Rapids, MI (US)

(73) Assignee: Flow-Rite Controls, Ltd., Grand Rapids, MI (US)

( * ) Notice: Subject to any disclaimer, the term of this patent is extended or adjusted under 35 U.S.C. 154(b) by 0 days.

(21) Appl. No.: 09/300,159

(22) Filed: Apr. 27, 1999

(51) Int. Cl.⁷ .......................... F16L 37/084; F16L 35/00
(52) U.S. Cl. .......................... 285/81; 285/319; 285/320; 285/423
(58) Field of Search .................. 285/81, 319, 320, 285/423, 86

(56) References Cited

U.S. PATENT DOCUMENTS

| | | |
|---|---|---|
| 3,711,125 | 1/1973 | Dehar . |
| 3,826,523 | 7/1974 | Eschbaugh . |
| 3,933,378 | 1/1976 | Sandford et al. . |
| 4,120,519 | 10/1978 | Bridges . |
| 4,123,091 | 10/1978 | Conentino et al. . |
| 4,373,753 | 2/1983 | Ayers et al. . |
| 4,444,419 * | 4/1984 | Maeshiba ........................ 285/320 |
| 4,486,034 | 12/1984 | Sauer . |
| 4,541,658 | 9/1985 | Bartholomew . |
| 4,589,684 | 5/1986 | Nowacki et al. . |
| 4,616,859 * | 10/1986 | Brunet ........................ 285/319 |
| 4,637,640 | 1/1987 | Fournier et al. . |
| 4,730,856 | 3/1988 | Washizu . |
| 4,778,203 | 10/1988 | Bartholomew . |
| 4,793,637 | 12/1988 | Laipply et al. . |
| 4,793,639 * | 12/1988 | Glover et al. ..................... 285/319 |
| 4,887,851 * | 12/1989 | Rush et al. ....................... 285/197 |
| 4,893,845 * | 1/1990 | Bartholomew .................... 285/319 |
| 4,913,467 | 4/1990 | Washizu . |
| 4,969,879 | 11/1990 | Lichte . |
| 5,078,429 | 1/1992 | Braut et al. . |
| 5,131,687 | 7/1992 | Marchou . |
| 5,248,168 | 9/1993 | Chichester et al. . |
| 5,324,082 * | 6/1994 | McNaughton et al. ............ 285/319 |
| 5,330,235 | 7/1994 | Wagner et al. . |
| 5,370,527 * | 12/1994 | Hefling et al. ..................... 431/247 |
| 5,378,025 | 1/1995 | Szabo . |
| 5,385,420 | 1/1995 | Newman, Sr. et al. . |
| 5,468,027 | 11/1995 | Guest . |
| 5,489,125 | 2/1996 | Hohmann . |
| 5,511,827 | 4/1996 | Steinkamp et al. . |
| 5,518,276 | 5/1996 | Gunderson . |
| 5,568,946 * | 10/1996 | Jackowski ........................ 285/319 |
| 5,593,187 * | 1/1997 | Okuda et al. ..................... 285/319 |
| 5,626,371 | 5/1997 | Barthlolmew . |
| 5,725,258 | 3/1998 | Kujawski . |
| 5,752,726 | 5/1998 | Fixemer . |
| 5,799,986 * | 9/1998 | Corbett et al. .................... 285/320 |
| 5,897,142 * | 4/1999 | Kulevsky ......................... 285/320 |
| 5,964,485 * | 10/1999 | Hame et al. ...................... 285/320 |

* cited by examiner

*Primary Examiner*—Eric K. Nicholson
(74) *Attorney, Agent, or Firm*—Niro, Scavone Haller & Niro

(57) ABSTRACT

The present invention is directed to a connector for joining fluid flow passegeways in a fluid handling system. The connector may be manually manipulated, without using any tools, to quickly and easily couple or decouple the mating connector components. Those components include a plug having a cylindrical plug wall and a radially extending flange, and a mating socket having a cylindrical socket wall and a pair of diametrically opposed retainers. The retainers each comprise an axially extending flexible lever spaced from the socket wall. The lever is joined to the socket wall at a base or proximal end and has a latch at its free or distal end. The lever is also joined to the socket wall by a fulcrum wall or living hinge positioned intermediate the ends of the lever. A split lock ring is disposed between the socket wall and each retainer and is movable from a position adjacent the base of each retainer to a position remote from the base of each retainer. The latch at the free end of each retainer is engageable with the plug flange to prevent disengagement of the plug and socket when the levers are in their free, unstressed state. However, the levers may be manually deflected or depressed at a flexing portion thereof when the lock ring is positioned adjacent the retainer bases to disengage each latch from the plug flange and thereby permit axial decoupling of the plug and socket.

11 Claims, 5 Drawing Sheets

CONNECTOR FOR FLUID HANDLING SYSTEM

BACKGROUND OF THE INVENTION

The present invention relates to fluid handling systems and, more particularly, to so-called "quick coupling" connectors which are manually manipulated to effect connection or disconnection.

Fluid handling systems, particularly those using flexible tubing or hose in sizes ¾ inch to 1½ inch I.D., typically include joints made with barbed connectors and hose secured with mechanical clamps such as worm type or deformable metal bands. These type of joints present problems for manufacturers who must maintain efficient, high volume production at the least cost, such as in the marine, appliance and specialized vehicle markets, including mobile washers and sprayers, as well as agricultural fertilizing and irrigation, to name a few. These joints can also be very difficult to service in the field if the joint is difficult to access with the necessary tool to remove the mechanical clamp.

For example, many recreational fishing boat manufacturers feature livewell/baitwell systems in their upper and mid-level boats. These systems typically use barbed fittings to connect hoses with various components, such as pumps, valves, aerator heads, thru-hull fittings, drain fittings, overflow fittings and the like. There may be two dozen or more hose connections in a single boat. Production line installation of these systems is time consuming, as each hose connection requires a clamp, typically a stainless steel worm type, which must be carefully positioned and properly tightened to assure a leak-tight joint. These clamps can be difficult to install in tight quarters, often typical of boat bilge areas, where much of the livewell system is located. Boat manufacturers leak test the system after installation and are often confronted with leaks at the hose connections. However, once installed, these systems are often covered by gas tanks and decking making access for service difficult, particularly if a tool, such as a screwdriver, must be used to remove the mechanical clamp. To partially solve this problem, many boat manufacturers have added the step of coating the barbed connector with silicone sealant before assembling the hose, in an effort to minimize the occurence of leaking hose joints. The silicone sealant, applied using a caulking gun type applicator, is sometimes used in excess which can restrict or completely block the opening in the hose or connector, a problem often not found until the boat is in service. Thus, boat manufacturers have had a long felt need for a system which would allow fast, reliable hose connections to be made on the production line and which would, in turn, reduce the number and duration of field repairs.

One of the important requirements for an improved hose connection system is that it must function with the standard hose that is currently used by boat manufacturers to plumb their livewell and bilge pump systems. This hose, which is widely available from a number of producers, is manufactured by co-extruding flexible PVC with a helical coil of rigid plastic integral within the hose wall. The resulting hose can accommodate a small radius bend without collapsing, yet is pliable so it can be easily routed around obstacles. The problem with this hose is that its outer wall is not smooth. The integral helical coil creates an outer surface unsuitable for sealing using an o-ring.

Another important requirement for an improved hose connection system is that it must be adaptable to existing barbed type fittings because not all system components may be readily changed. System components may be sourced from several manufacturers, so a new standard is not readily implementable.

Any improved hose connection system must not be so bulky as to cause interference with adjacent structure.

An improved hose connection system must be simple and inexpensive, and therefore practical for use on all system joints.

A review of available prior art quick coupling systems shows that none is suitable to meet these requirements. There is nothing that would allow existing barbed fittings to be quickly adapted to serve as quick coupling fittings and eliminate mechanical clamps. Also, there are no quick couplings that are both functional and simple enough to produce at a cost low enough to be widely used in volume production applications, such as those described above.

One available quick coupling is the push-to-connect type where a socket and retaining collet are incorporated onto the fluid system component to which the hose is to be attached. The hose is simply pushed into the socket to form a leak-tight, positively retained connection. Invariably, this type of quick coupling uses an o-ring seal between the inside wall of an outer sleeve and the outside wall surface of the tube. A reliable seal requires a tube with a smooth outer wall. In addition, the tubing must be sufficiently stiff to maintain contact with the o-ring without collapsing or distorting under the o-ring compression loading or under the tube stresses created if the tubing is bent abruptly at the connector exit plane. For reasons cited above, standard marine hose does not have either the smooth wall or the stiffness characteristics which would allow push-to-connect type of quick couplings to be used satisfactorily. In addition, push-to-connect quick couplings would be too expensive to incorporate on all of the different types of fluid system fittings and components used, and no fitting exists which would readily convert a barbed connector to a quick coupling fitting.

Other types of prior art quick couplings typically use a male insert portion which includes an o-ring seal member and a female socket portion which includes a smooth bore into which the male portion is inserted, creating a leak-tight seal. A locking and quick release latch system is generally incorporated into the female socket portion. These are the basic components of the subject quick coupling system also, but the special needs of the markets addressed, require novel features not heretofore available.

SUMMARY OF THE INVENTION

The present invention is directed to a connector for joining fluid flow passegeways in a fluid handling system. The connector may be manually manipulated, without using any tools, to quickly and easily couple or decouple the mating connector components. Those components include a plug having a cylindrical plug wall and a radially extending flange, and a mating socket having a cylindrical socket wall and a pair of diametrically opposed retainers. The retainers each comprise an axially extending flexible lever spaced from the socket wall. The lever is joined to the socket wall at a base or proximal end and has a latch at its free or distal end. The lever is also joined to the socket wall by a fulcrum wall or living hinge positioned intermediate the ends of the lever. A split lock ring is disposed between the socket wall and each retainer and is movable from a position adjacent the base of each retainer to a position remote from the base of each retainer. The latch at the free end of each retainer is engageable with the plug flange to prevent disengagement of the plug and socket when the levers are in their free, unstressed state. However, the levers may be manually deflected or depressed at a flexing portion thereof when the lock ring is positioned adjacent the retainer bases to disengage each latch from the plug flange and thereby permit axial decoupling of the plug and socket.

The present invention is also directed to a kit of fluid flow components for a marine fluid handling system that permits the efficacious production assembly and field maintenance of such systems. The kit includes segments of hose of the type previously described, one or more quick coupling connectors, and adaptors used to convert barbed marine fittings into a connector plug or change the barbed connector size to accommodate larger hose sizes.

It is therefore an object of the present invention to provide a quick coupling fluid handling connector that is manually manipulated, very cost effective to produce and install, and which occupies a minimal size envelope relative to the hoses and fittings used with the connector.

It is also an object of the invention to provide a locking element with the connector having a positive tactile feature to facilitate locking and unlocking of the connector when positioned out of sight.

Still another object of the invention is the provision of a kit of fluid handling components that permit the simple and cost effective assembly and maintenance of marine fluid handling systems.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

It will be appreciated by those skilled in the art that various changes and modifications can be made to the illustrated embodiments without departing from the spirit of the present invention. All such modifications and changes are intended to be covered by the appended claims.

Figure 1:
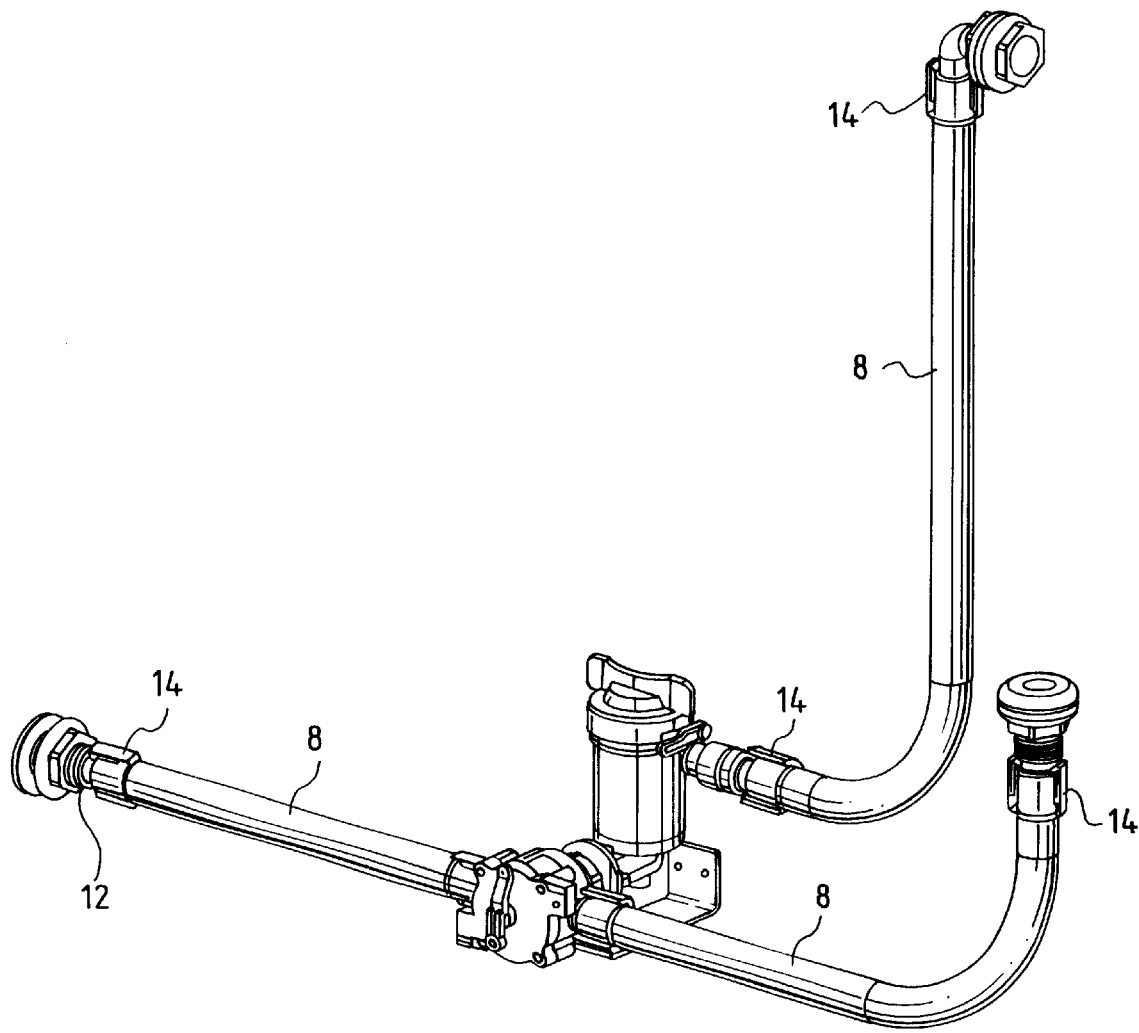
FIG. 1 is a perspective view illustrating different components of the present invention as employed in a marine fluid handling system.

As illustrated in FIG. 1, the invention finds particularly advantageous application in marine fluid handling systems, typically including segments of marine hose 8, joined to various marine fluid handling components such as pumps, drain fittings, hull fittings, valves, aerators and the like. However, the specific quick coupling connector of the present invention may also be used in other fluid handling systems.

Figure 2:
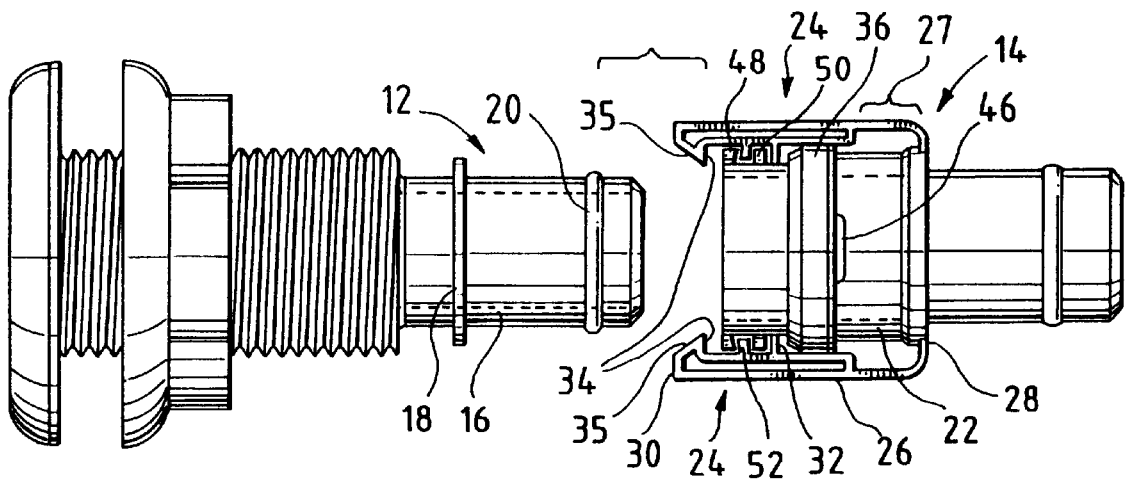
FIG. 2 is an exploded side view illustrating the quick coupling connector of the present invention.
Figure 3:
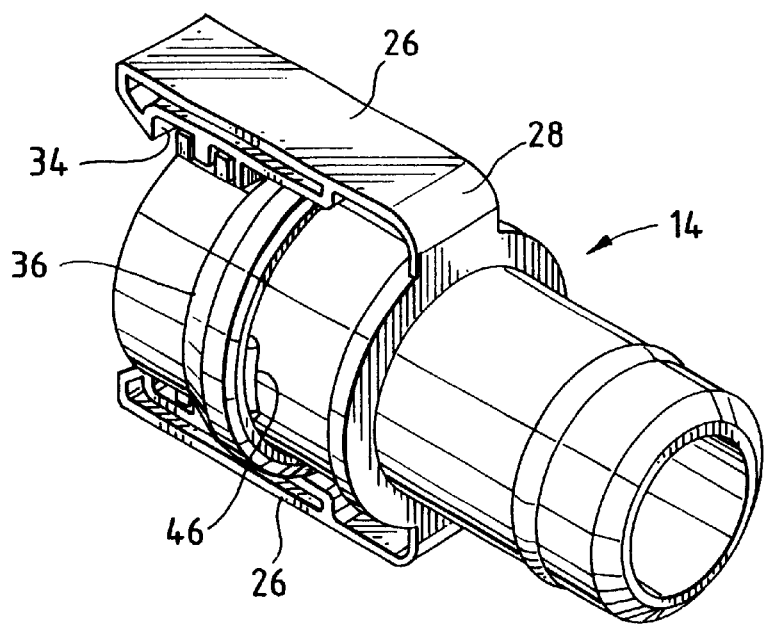
FIG. 3 is a perspective view of the socket component of the connector illustrated in FIG. 2.
Figure 4:
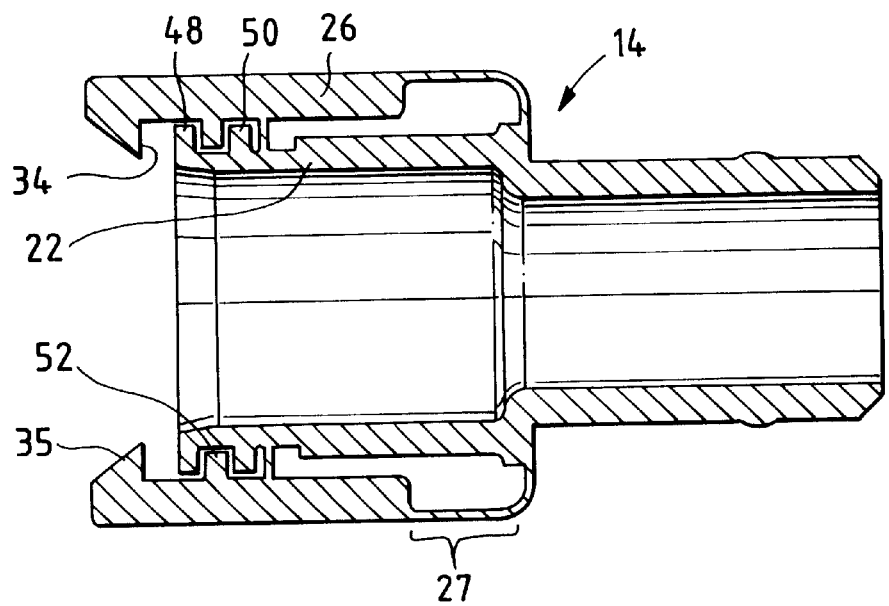
FIG. 4 is a cross-sectional view of the socket of FIG. 3 without the lock ring or lock ring detest

The connector of the present invention, designated generally as 10, is illustrated in FIG. 2. It includes both a plug 12 and socket 14. The plug forms the termination of a fluid flow passageway, such as a hose or fitting, and has a cylindrical plug wall 16 and radially extending flange 18. An o-ring 20 or other suitable sealing member is disposed on the outside of the plug wall 16. The socket forms the termination of another fluid flow passageway and includes a cylindrical socket wall 22 sized to receive plug wall 16 and to seal against o-ring 20. The socket 14 also includes a pair of manually manipulated retainers 24 which are preferably positioned at diametrically opposing positions on the socket wall 22. Each retainer 24 is comprised of a flexible lever 26 extending axially along, but spaced radially from, the socket wall. The levers 26 are joined to the socket wall at a proximal base end 28 and extend to a distal free end 30. A fulcrum wall or living hinge 32 joins the levers 26 to the socket wall 22 at an intermediate location. Each lever also includes an inwardly extending latch 34 at its free end, each latch having a camming front surface 35 to drive the latches radially out and over the plug flange 18 upon axial coupling of the plug and socket.

When the connector is fully connected and the retainer levers 26 are in their free unstressed state, the latches 34 are engageable with the flange 18 to thereby prevent unintended decoupling of the connector.

Figure 5:
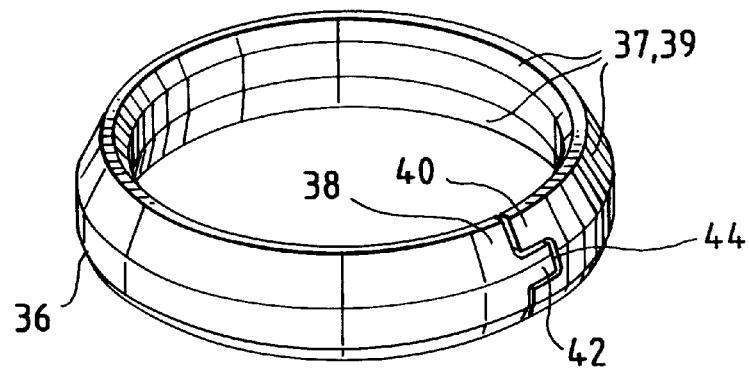
FIG. 5 is a perspective view of the lock ring illustrated in FIG. 2.
Figure 6:
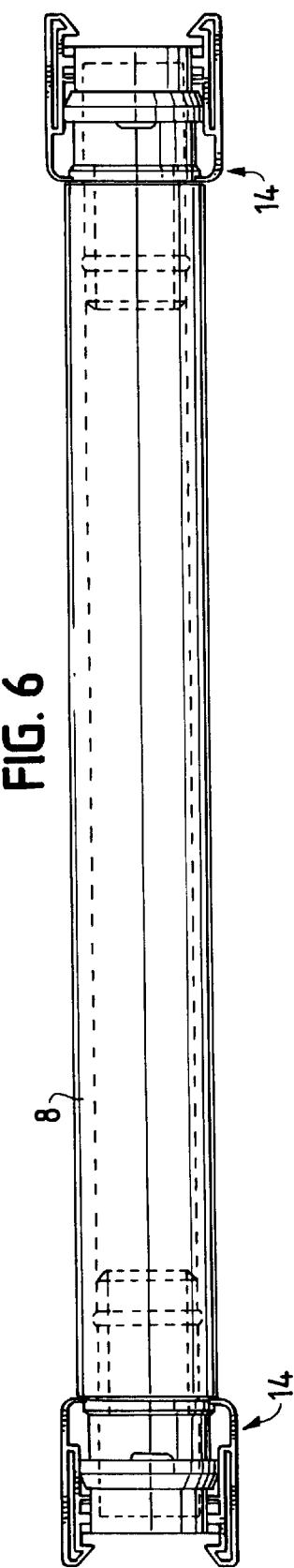
FIG. 6 is a typical hose and socket assembly made in accordance with the present invention.
Figure 7:
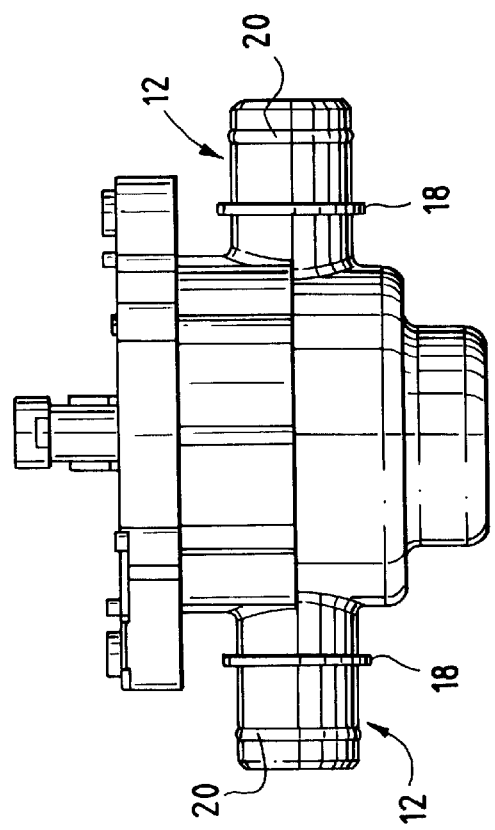
FIG. 7 is a typical adaptation of a marine flow control valve to include the plug component of connector according to the present invention.

The connector 10 also includes a split lock ring 36 which is circumferentially expandable. As shown in FIG. 5, the ring 36 includes two ends, 38 and 40, which coact by reason of key 42 and keyway 44. The split ring is easily assembled to its operative position between retainer levers 26 and socket wall 22 and can be moved axially from a position adjacent the lever bases 28 to a position remote from those bases. The socket wall 22 may also include a detent or boss 46 located intermediate each fulcrum 32 and base 28 which acts to hold ring 36 in either of its two operative positions. Preferably split ring 36 also has beveled surfaces 37 and 39 to facilitate movement of the ring up and over the detents 46. The key 42 and keyway 44 serve to minimize any skewing of the ring as it is slid axially along the socket wall 22.

In addition, the connector 10 may also employ annular, radially projecting load bars 48, 50 and 52. These bars tend to minimize stresses that might otherwise damage the thin fulcrum wall 32 upon axial loading of the retainers. Most preferably the facing surfaces between load bars 48 and 52 are inclined so that a radially inward force is generated on latches 34 when an axially tension force is imparted to the plug and socket.

In operation, the plug and socket may be axially joined and in their fully coupled position, the latches 34 prevent decoupling. Thus, with the levers 26 in their free and unstressed state, the latches 34 will engage flange 18. However, the levers 26 include a resilient or flexible portions 27 which permit deflection of the levers inwardly when the lock ring is located adjacent the base 28 of the levers. This deflection, in turn, causes the latches 34 to move radially away from flange 18, thereby permitting axial decoupling of the plug and socket. When the lock ring is positioned remote from the base 28, in other words adjacent fulcrum 32, the levers may not be deflected, thereby preventing disengagement of the latches.

As illustrated in FIGS. 1 and 2, connector plug 12 may be formed as an extension of a fitting which includes a head 70, a thread bearing shank 71 and a fastener 72. To facilitate the engagement of fastener 72 with thread bearing shank 71, flange 18 has an outside diameter which is smaller than the minor diameter of the thread on shank 71. As shown in FIG. 2, lock ring 36 preferably has a radial thickness substantially equal to the radial spacing between retainer levers 26 and socket wall 22 at the location remote from the base 28 of each retainer 24.

Figure 8:
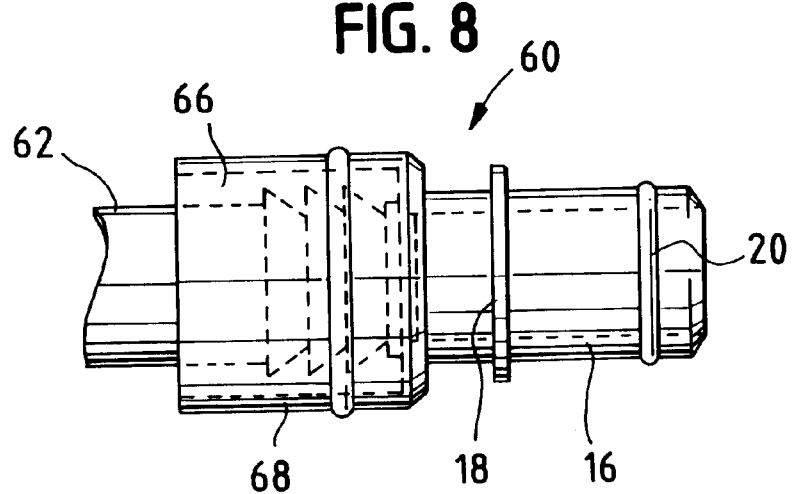
FIG. 8 is a side view of an adaptor used in the present invention.

An adaptor 60 is illustrated in FIG. 8. The adapter is an important component necessary for the marine industry to convert existing fluid components with standard barbed connectors to the quick coupling connector. For example, standard barbed connectors 62 are found on typical marine bilge, livewell and baitwell components such as thru-hull fittings, flow control valves, and bilge and aerator pumps. The adapter converts standard barbed connectors to the plug design of the connector, allowing hose segments 64 with connector sockets to be snapped quickly into place, or removed quickly for field repair of system components.

The adapter can be pushed over the barbed connector 62 by hand even though the I.D. of the resilient liner 66 is smaller than the O.D. of the barbed connector. The rigid wall 68, surrounding the resilient liner resists expansion and thus creates a uniform radial compression loading on the barbed connector. The resilient liner, normally an elastomer, conforms to the barbs to provide high friction for retention and to form a leak tight seal. The liner is sufficiently resilient to allow hand assembly and create a leak tight seal while being firm enough to provide adequate retaining friction. While a firm push is needed to install the adapter, a much higher force is needed for its removal due to the holding power of the reverse barbs which dig into the resilient liner. A durometer in the range of 40 to 60 Shore A is preferred for the liner.

Figure 9:
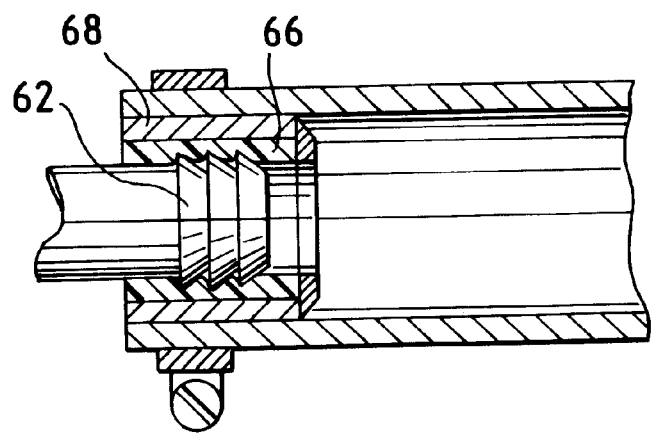
FIG. 9 is a side cross-section of another adaptor used in the present invention.

A barbed connector size adapter shown in FIG. 9 is also useful in the practice of the present invention for changing the size of a barbed connector so that it can function with larger I.D. hose. Once again, standard barbed connectors are found on typical marine bilge, livewell and baitwell components. In some cases it is desired to directly connect a hose of a larger size to barbed connectors designed for smaller hose.

The barbed connector size adapter can be pushed over the barbed connector 62 by hand even though the I.D. of the resilient liner 66 is smaller than the O.D. of the barbed connector. The rigid wall 68 surrounding the resilient liner resists expansion and thus creates a uniform radial compression loading on the barbed connector. The resilient liner, normally an elastomer, conforms to the barbs to provide high friction for retention and to form a leak tight seal. The liner is sufficiently resilient to allow hand assembly and create a leak tight seal while being firm enough to provide adequate retaining friction. While a firm push is needed to install the adapter, a much higher force is needed to remove the adapter due to the holding power of the reverse barbs which dig into the resilient liner. Again, a durometer in the range of 40 to 60 Shore A is preferred. The O.D. of the rigid cylindrical wall is sized to accommodate the desired hose I.D. The adapted hose may be retained with a conventional hose clamp.

It will be appreciated by those skilled in the art that various changes and modifications can be made to the illustrated embodiments without departing from the spirit of the present invention. All such modifications and changes are intended to be covered by the appended claims.

I claim:

1. A connector for joining fluid flow passageways in a fluid handling system comprising:

a plug forming the termination of a first passageway and including a cylindrical plug wall and a radially extending flange;

a socket forming the termination of a second passageway and including a cylindrical socket wall and a pair of opposed retainers adapted to releaseably maintain the plug and socket in mated relationship;

each said retainer comprising an axially extending lever spaced radially from the socket wall, the lever being joined to the socket wall at a base end and having a latch disposed at a free end, the lever also being joined to the socket wall by a fulcrum wall positioned intermediate the ends of the lever; and a lock ring disposed between the levers of each retainer and the socket wall, the lock ring being moveable from a position adjacent the base end of each retainer to a position remote from the base end of each retainer;

the latch of each retainer being engageable with the plug flange to prevent uncoupling of the plug and socket; and the lever of each retainer being depressable when the lock ring is positioned adjacent the retainer bases to disengage each latch from said flange.

2. A connector for joining fluid flow passageways in a fluid handling system comprising:

a plug forming the termination of a first passageway and including a cylindrical plug wall and a radially extending flange;

a socket forming the termination of a second passageway and including a cylindrical socket wall and a pair of diametrically opposed retainers adapted to releaseably maintain the plug and socket in mated relationship;

each said retainer comprising an axially extending lever spaced radially from the socket wall, the lever being joined to the socket wall at a base end and having a latch disposed at a free end, the lever also being joined to the socket wall by a fulcrum wall positioned intermediate the ends of the lever;

each retainer including at least one load bar extending radially inward, each said load bar positioned to engage a complimentary surface on the socket wall;

the latch of each retainer being engageable with the plug flange to prevent uncoupling of the plug and socket; and the lever of each retainer being depressable to disengage each latch from said flange.

3. The connector of claim 2 wherein each retainer includes a flexible wall portion adjacent its base end.

4. The connector of claim 2, wherein each retainer includes at least one load bar extending radially inward, each load bar positioned to engage a complimentary surface on the socket wall.

5. The connector of claim 2 wherein each said load bar includes an inclined socket wall engaging surface to generate a radially inward force upon the application of an axial tension load to the retainers.

6. The connector of claim 2 wherein the radial spacing between the retainer levers and the socket wall is greater at a location adjacent the base end of each retainer than is the spacing at a location remote from the base end of each retainer.

7. The connector of claim 6 further comprising a lock ring disposed between the levers of each retainer and the socket wall, the lock ring being movable between a position adjacent the base end of each retainer and a position remote from the base end of each retainer.

8. The connector of claim 7 wherein the lock ring has a radial thickness substantially equal to the radial spacing between the retainer levers and the socket wall at the location remote from the base end of each retainer.

9. The connector of claim 2, wherein the plug is formed as an extension of a fitting, said fitting including a head and a thread bearing shank for threadably engaging a mating internally threaded fastener, the radially extending flange on the plug wall having an outside diameter smaller than the minor diameter of the thread on the shank.

10. A connector for joining fluid flow passageways in a fluid handling system, comprising:

a plug forming the termination of a first passageway and including a plug wall and a radially extending flange;

a socket forming the termination of a second passageway and including a socket wall and a pair of opposed retainers adapted to releaseably maintain the plug and socket in mated relationship;

each retainer comprising an axially extending flexible lever spaced radially from the socket wall, the lever being joined to the socket wall at a base and having a latch disposed at a free end, the lever also being joined to the socket wall by a fulcrum wall;

the latch of each retainer being engageable with the flange to prevent uncoupling of the plug and socket;

the lever of each retainer being depressable to disengage each latch from the flange; and a lock ring disposed between the levers of each retainer and the socket wall, the lock ring being movable between a first location permitting disengagement of the latches and a second position preventing disengagement of the latches.

11. The connector of claim 10 wherein the lock ring comprises a circumferentially expandable split ring.

* * * * *